United States Patent
Ito et al.

(10) Patent No.: US 6,888,559 B2
(45) Date of Patent: May 3, 2005

(54) LASER BEAM SCANNER FORMING A SCANNING LINE ALONG A MAIN SCANNING DIRECTION

(75) Inventors: Koji Ito, Motosu-gun (JP); Ryota Kato, Nagoya (JP); Yasuo Tamaru, Nagoya (JP); Yutaka Hattori, Kuwana (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 920 days.

(21) Appl. No.: 09/758,144

(22) Filed: Jan. 12, 2001

(65) Prior Publication Data

US 2002/0063908 A1 May 30, 2002

(30) Foreign Application Priority Data

Jan. 21, 2000 (JP) ........................................ 2000-012970

(51) Int. Cl.[7] .............................................. B41J 2/435
(52) U.S. Cl. ....................................... 347/250; 347/235
(58) Field of Search .................................. 347/235, 241, 347/244, 250, 256, 258; 250/235; 359/217

(56) References Cited

U.S. PATENT DOCUMENTS 4,720,632 A * 1/1988 Kaneko ........................ 250/235
4,847,492 A * 7/1989 Houki .......................... 359/217

* cited by examiner

Primary Examiner—Hai Pham
(74) Attorney, Agent, or Firm—Oliff & Berridge, PLC

(57) ABSTRACT

A laser beam scanner converges a laser beam by using a first fθ lens and a second fθ lens in a main-scanning direction and in a sub-scanning direction, respectively, onto a photosensitive medium, thereby forming a scanning line on the photosensitive medium along the main-scanning direction. Before scanning the photosensitive medium, the laser beam that has passed through and been converged by the first fθ lens, but not passed through the second fθ lens, is guided to a beam detector and converged by a cylinder lens in the sub-scanning direction so that the laser beam falls within a detection area of the beam detector. The beam detector determines a scan start time by detecting the laser beam.

26 Claims, 9 Drawing Sheets

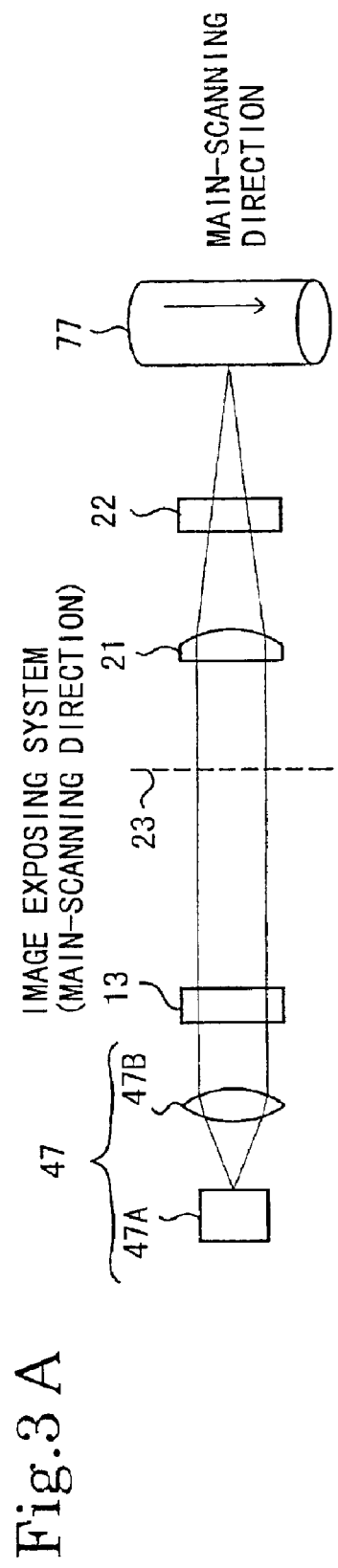
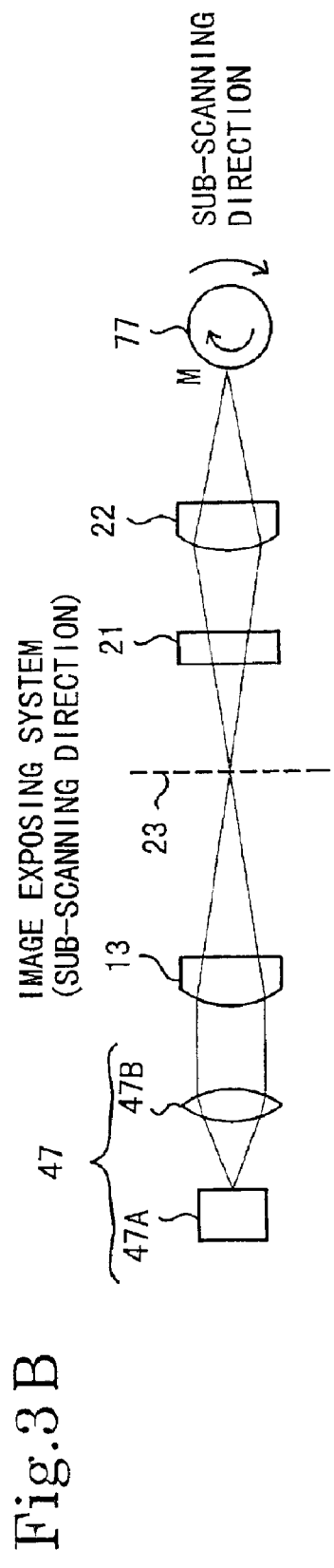

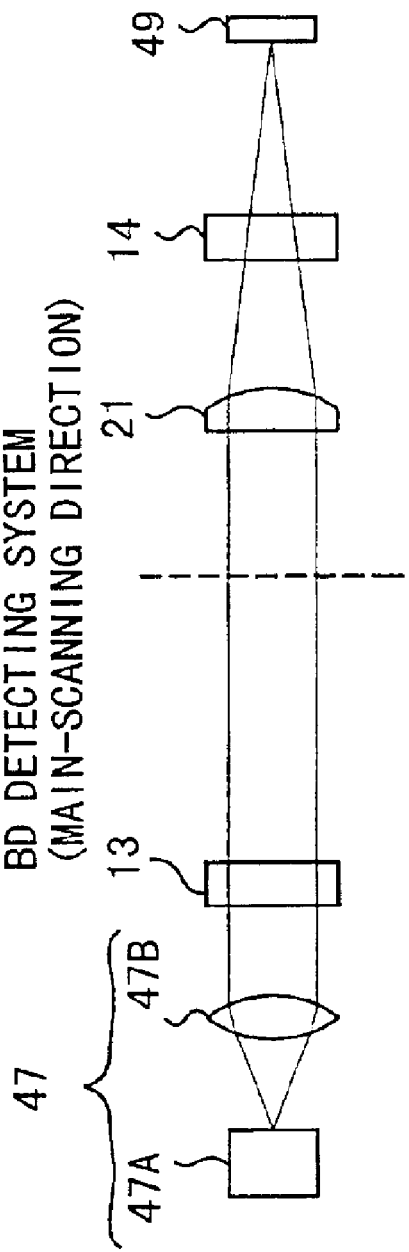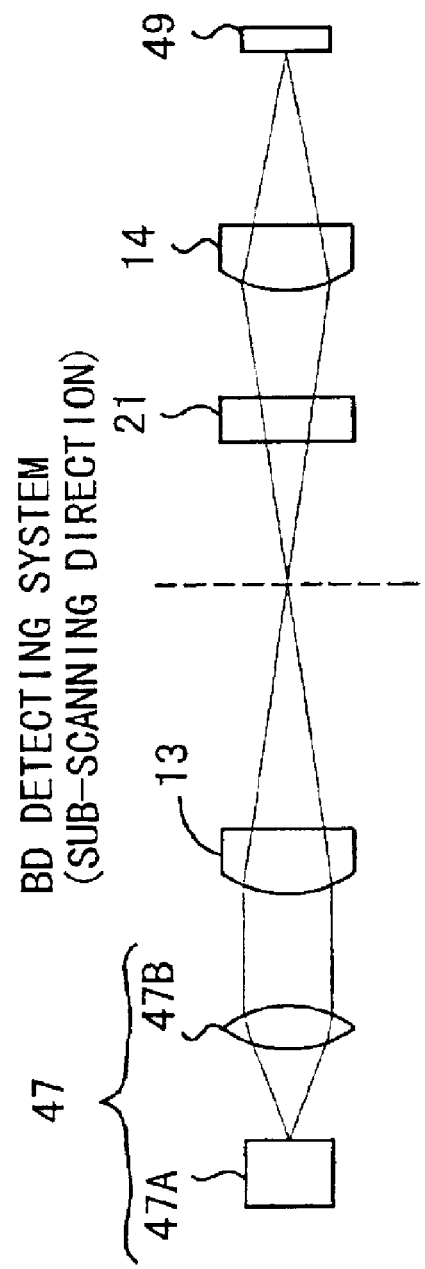

Fig.4 A
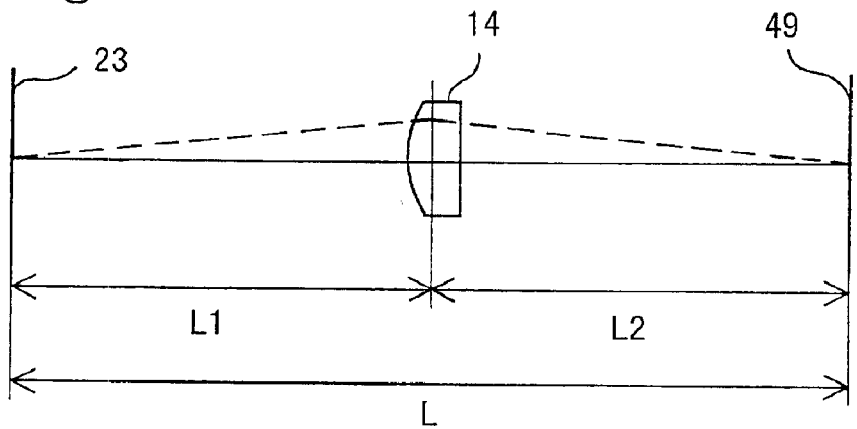
Fig.4 B
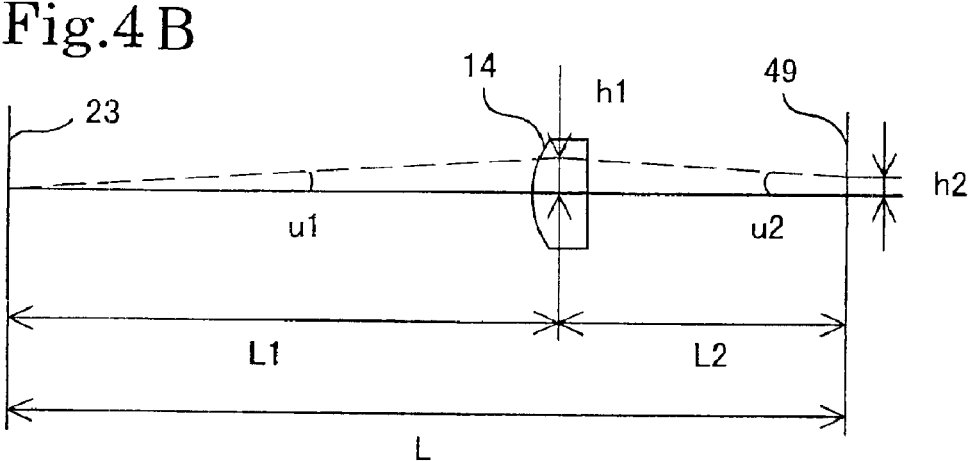
Fig.4 C
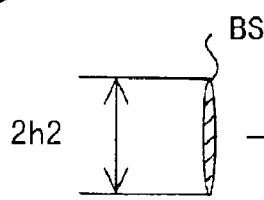
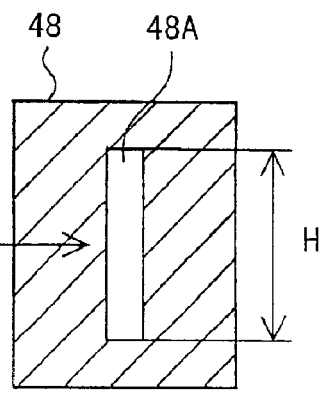

LASER BEAM SCANNER FORMING A SCANNING LINE ALONG A MAIN SCANNING DIRECTION

BACKGROUND OF THE INVENTION

1. Field of Invention

The invention relates to a laser beam scanner that scans a photosensitive medium with a laser beam and exposes an image on the photosensitive medium.

2. Description of Related Art

Laser beam scanners have become widely used in recent years. By way of example, FIG. 8 shows a main structure of a conventional laser beam scanner 100. The laser beam scanner 100 comprises a laser source 101, a cylindrical lens 102, a polygon mirror 103, a first fθ lens 104, a second fθ lens 105, a beam detector 106, a focusing lens 107, and a photosensitive drum 110. The laser source 101 has a semiconductor laser element for emitting a laser beam and a collimate lens that are integrated into a single unit.

The laser beam emitted from the laser source 101 is converged by the cylindrical lens 102 and, then, is deflected by the polygon mirror 103. The deflected laser beam is converged by the first fθ lens 104 and the second fθ lens 105 onto the photosensitive drum 110. Herein, the first fθ lens 104 has the ability to converge the laser beam in a main-scanning direction, while the second fθ lens 105 has the ability to converge the laser beam in a sub-scanning direction.

The laser beam reaches the focusing lens 107 before irradiating the photosensitive drum 110. When the laser beam is converged by the focusing lens 107 to the beam detector 106, the beam detector 106 detects the laser beam, and determines a scan start time to start scanning an image area on the photosensitive drum 110. The beam detector 106 is arranged at a certain position to which the laser beam is converged, but out of the image area on the photosensitive drum 110.

Further, there is provided another type of laser beam scanner. This type of laser beam scanner has a structure similar to the above-explained laser beam scanner, but further comprises a mirror for reflecting a laser beam that has passed through the second fθ lens 105. The laser beam reflected by the mirror is converged by the focusing lens 107, and is detected by the beam detector 106.

The conventional laser beam scanners are applied, for example, to laser printers and digital copiers. The desire to miniaturize laser printers and digital copiers has grown in these application areas in recent times. Especially, saving space around the photosensitive drum 110 and the second fθ lens 105 is an important issue, because both the photosensitive drum 110 and the second fθ lens 105 have great widths in the main-scanning direction and occupy a large amount of space.

However, every conventional laser beam scanner has to comprise the beam detector 106 and the focusing lens 107 arranged around the photosensitive drum 110 and the second fθ lens 105, so that the laser beam that has passed through the second fθ lens 105 is converged to the beam detector 106 just before reaching the photosensitive drum 110. Such an arrangement makes it difficult to save space around the photosensitive drum 110 and the second fθ lens 105.

In addition, the conventional laser beam scanner has various kinds of lens (such as a cylindrical lens, an fθ lens, and a converging lens), as described above, for properly bringing the laser beam into focus on the photosensitive drum 110 and on the beam detector 106. The lenses cannot share their individual functions with the other lenses. Thus, the laser beam scanner must have all of the lenses, thereby leading to high manufacturing cost.

The invention has been developed to resolve the above-mentioned and other problems, and especially to provide a laser beam scanner that scans a photosensitive medium with a laser beam and exposes an image on the photosensitive medium.

SUMMARY OF THE INVENTION

According to the invention, there is provided a laser beam scanner for forming a scanning line along a main-scanning direction with a laser beam, comprising a laser diode that emits a laser beam; a first converging unit that converges the laser beam in a main-scanning direction; a second converging unit that converges the laser beam that has been converged by the first converging unit in a sub-scanning direction substantially perpendicular to the main-scanning direction; a scan start time determination unit that detects, within a predetermined detection area, the laser beam that has been converged by the first converging unit before being converged by the second converging unit, and determines a scan start time upon the detection of the laser beam; a photosensitive medium on which a scanning line is formed along the main-scanning direction; and a scan controller that controls a start, at the determined scan start time, of scanning of the photosensitive medium with the laser beam that has been converged by the first converging unit and the second converging unit.

In the conventional laser beam scanner, the scan start time determination unit detects the laser beam that has been converged by the first converging unit and the second converging unit. However, according to the invention, the scan start time determination unit detects the laser beam that has been converged in the main-scanning direction by the first converging unit, before being converged by the second converging unit. Therefore, it is not necessary to provide the scan start time determination unit around the photosensitive medium and the second converging unit. This allows reducing the spaces around the photosensitive medium and the second converging unit, and develops a small version of the laser beam scanner.

In addition, the laser beam scanner of the invention further comprises a third converging unit that converges the laser beam converged by the first converging unit and traveling to the scan start time determination unit, so that the laser beam falls within the predetermined detection area. It makes it possible for the scan start time determination unit to detect the laser beam precisely with a sufficient laser beam amount.

BRIEF DESCRIPTION OF THE DRAWINGS

The above and other objects, features and advantages of the invention will become more apparent from the following description of exemplary embodiments taken in connection with the accompanying drawings in which:

FIGS. 3A and 3B schematically show how the laser beam scanner of the invention scans a photosensitive medium with a laser beam in a main-scanning direction and in a sub-scanning direction, respectively;

FIGS. 3C and 3D schematically show how the laser beam scanner of the invention detects the laser beam by using a beam detector, when viewed along the main-scanning direction and along the sub-scanning direction, respectively;

FIG. 4A schematically illustrates the laser beam that is converged to the beam detector, when viewed along the sub-scanning direction;

FIG. 4B schematically illustrates the laser beam that is not properly converged to the beam detector, when viewed along the sub-scanning direction;

FIG. 4C shows a relationship between a slit and a beam spot converged in the main-scanning direction;

DETAILED DESCRIPTION OF PREFERRED EMBODIMENTS

An explanation will be given of a laser beam scanner in accordance with the invention based on the following exemplary embodiments. Herein, the exemplary embodiments refer to a laser beam scanner 12 provided in a laser printer 1.

Figure 1:
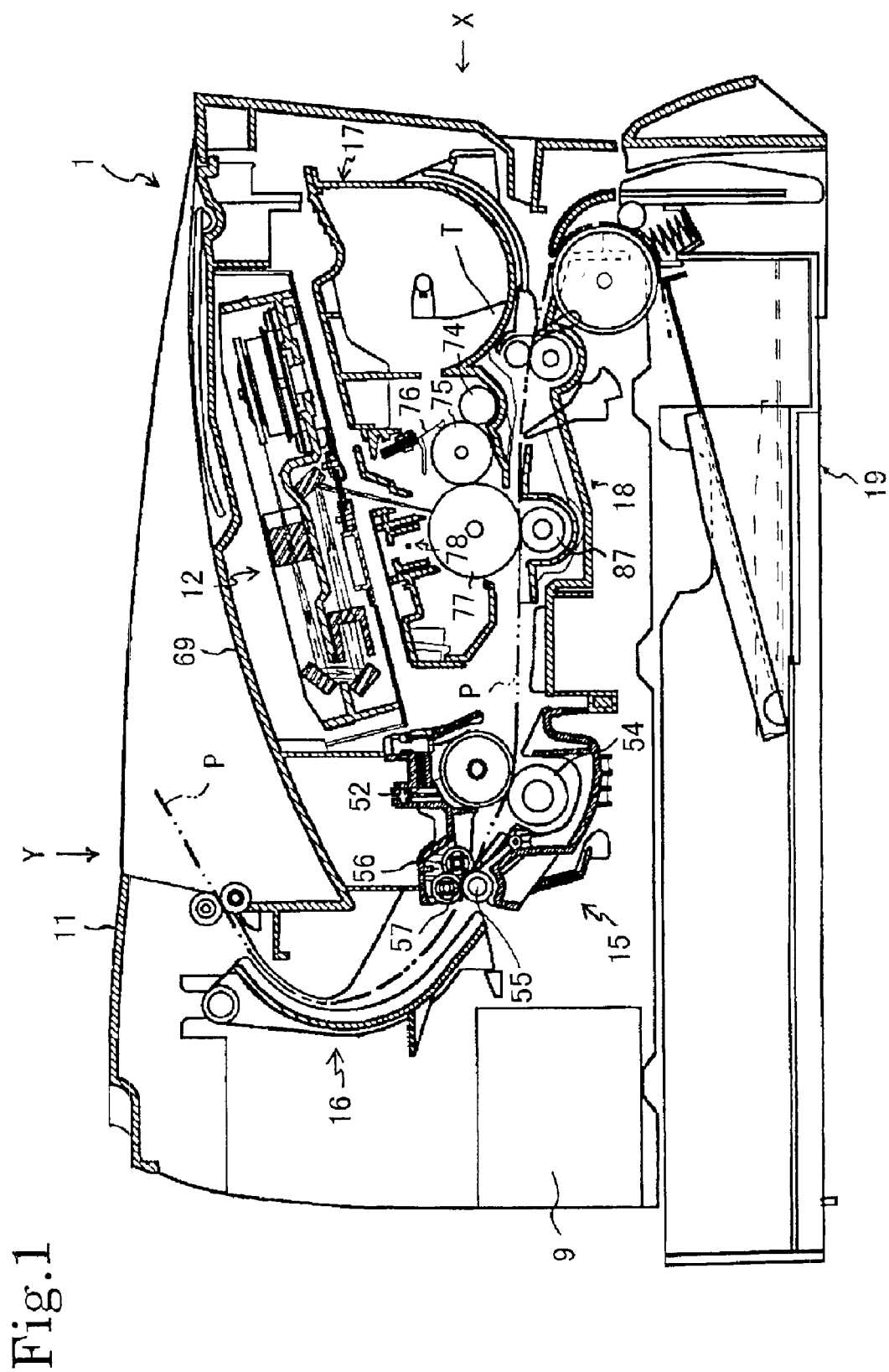
FIG. 1 is a cross-sectional view of a laser printer according to the invention, when viewed from a direction perpendicular to a sheet transporting direction.

Firstly, the overall structure of the laser printer 1 will be described while referring to FIG. 1. FIG. 1 is a cross-sectional view of the laser printer 1 when viewed in a direction perpendicular to a sheet transporting direction. The front surface and the top surface of the laser printer 1 can be seen in directions indicated by arrows X and Y, respectively.

The laser printer comprises a body frame 11, a feed unit 19 including a sheet cassette (not shown in figures) in a lower part of the body frame 11, a transport unit 18, a developing unit 17 including the photosensitive drum 77, a transfer roller 87, a fixing unit 15, a discharge unit 16, a sheet stack portion 69 and the laser scanner 12 of the invention, being positioned above the developing unit 17. By the body frame 11, the overall shape of the laser printer 1 is formed in a generally parallelepiped shape.

The feed unit 19 holds sheets P in the sheet cassette and feeds a sheet P to the transport unit 18. The transport unit 18 transports the sheet P from the feed unit 19 to an image transfer position located between the photosensitive drum 77 and the transfer roller 87. The developing unit 17 has the photosensitive drum 77, a developing roller 75, a supply roller 74, a blade 76 and a charger 78, and holds therein toner T. Whereupon the charger 78 charges the photosensitive medium 77 uniformly, the laser scanner 12 scans the charged photosensitive drum 77 with a laser beam based on the image data, thereby forming a latent image on the photosensitive drum 77. The supply roller 74 supplies the toner T to the developing toner T, while the blade 76 scrapes excessive toner T from the developing roller 75 and adjusts the amount of the toner T on the developing roller 75 appropriately. The latent image is developed with the toner T, thereby forming a visible image. The transfer roller 87 transfers the visible image from the photosensitive drum 77 to the sheet P, by sandwiching the sheet P therebetween, at the image transfer position. The transport unit 18 further transports the sheet P with the transferred image to the fixing unit 15. The fixing unit 15 sandwiches the sheet P between a heat roller 52 and a press roller 54, and heats and pressurizes the sheet P, so that the toner T is melted and penetrates into the fibers of the sheet P. By this, the image is fixed on the sheet P. The discharge unit 16 comprises a discharge roller 55 and subsidiary rollers 56, 57 that are driven in synchronism with the discharge roller 55. The discharge unit 16 discharges the sheet P out of the fixing unit 15, by using the discharge roller 55 and the subsidiary rollers 56, 57, onto the sheet stack portion 69.

Figure 2:
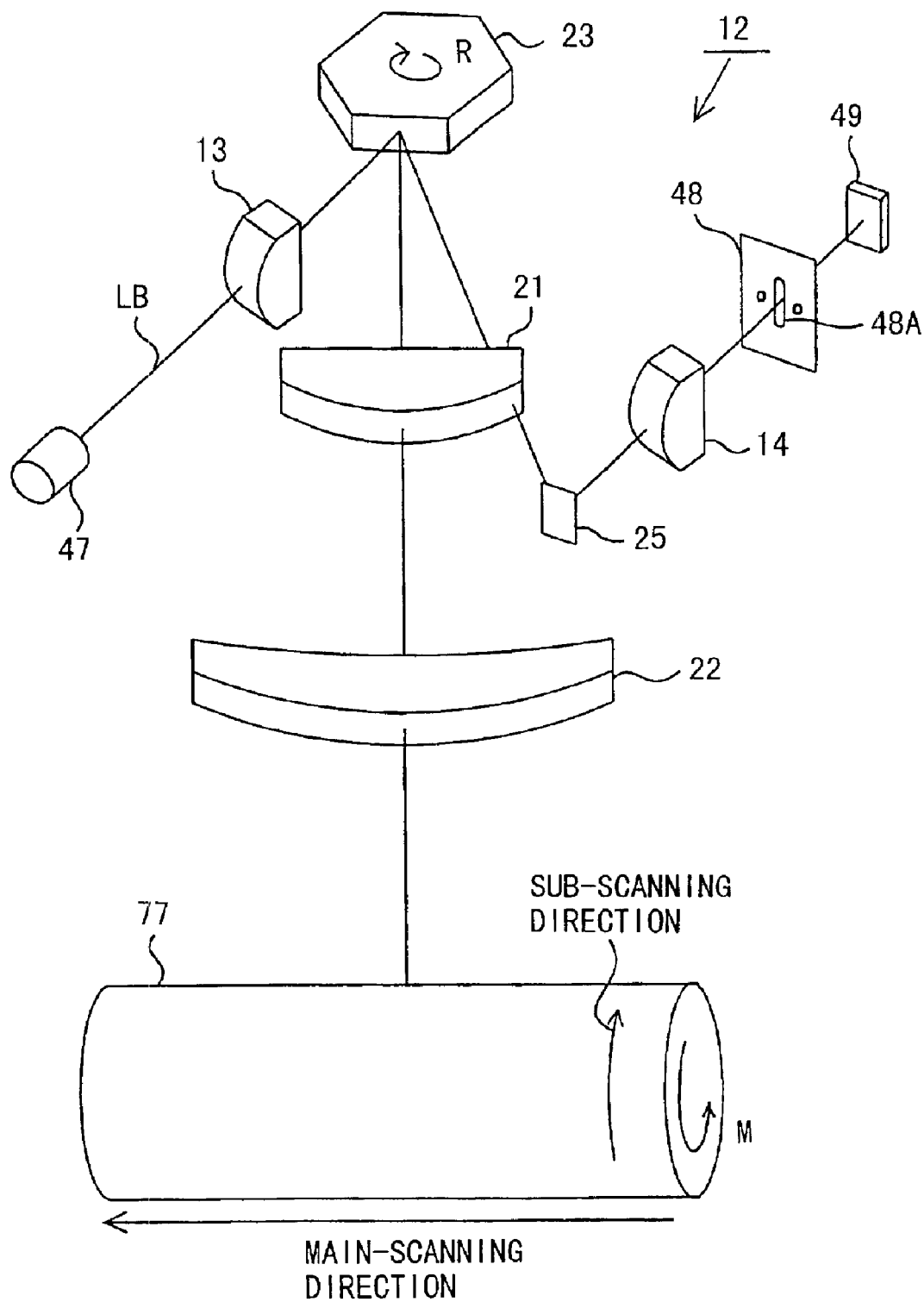
FIG. 2 is a perspective view of a laser beam scanner according to one embodiment of the invention.

Next, the main structure of the laser beam scanner 12 according to one embodiment of the invention will be described with reference to FIGS. 2 and 3A to 3D. FIG. 2 is a perspective view of the laser beam scanner 12. FIGS. 3A and 3B schematically show how the laser beam scanner 12 scans the photosensitive drum 77 with a laser beam LB in a main-scanning direction and in a sub-scanning direction, respectively. FIGS. 3C and 3D schematically show how the laser beam LB is converged to the beam detector 49, when viewed along the main-scanning direction and along the sub-scanning direction, respectively.

The laser beam scanner 12 comprises a laser beam source 47, a first cylinder lens 13, a second cylinder lens 14, a polygon mirror 23, a first fθ lens 21, a second fθ lens 22, a mirror 25, a plate-shaped member 48 having a slit 48A therein, and a beam detector 49. The laser beam source 47 includes a laser diode 47A for emitting a laser beam LB and a collimate lens 47B (shown in FIG. 3) as an integrated unit. The first fθ lens 21 has the ability to converge the laser beam LB in the main-scanning direction, while the second fθ lens 22 has the ability to converge the laser beam LB in the sub-scanning direction. The first and the second cylinder lenses 13, 14 are the same in this embodiment.

The laser beam LB emitted from the laser beam source 47 is converged, principally in the sub-scanning direction, by the first cylinder lens 13 and is irradiated to the polygon mirror 23. All the while, the polygon mirror 23 rotates in a moving direction indicated by an arrow R of FIG. 2 at a high rotation speed, being driven by a scanner motor (not shown in figures). Thus, the polygon mirror 23 deflects the laser beam LB so as to move the laser beam LB at a constant angular velocity. The laser beam LB deflected by the polygon mirror 23 is converged, principally in the main-scanning direction, by the first fθ lens 21, as shown in FIG. 3A. Further, the laser beam LB is converged, principally in the sub-scanning direction, by the second fθ lens 22, as shown in FIG. 3B. The laser beam LB converged by the first and the second fθ lenses 21, 22 scans the photosensitive drum 77 in the main-scanning direction, thereby forming a scanning line along the main-scanning direction on the photosensitive drum 77.

Before scanning the photosensitive drum 77, the laser beam LB is reflected by the mirror 25. The reflected laser beam LB does not pass through the second fθ lens 22. Instead, the reflected laser beam LB is passed through the second cylinder lens 14, that has the ability to converge the laser beam LB in the sub-scanning direction, and is converged, principally in the sub-scanning direction, as shown in FIG. 3D. Then, the laser beam LB passes through the slit 48A and reaches the beam detector 49. The laser beam LB, being converged by the first fθ lens 21 and the second cylinder lens 14 to pass through the slit 48A, has a light amount sufficient to be detected by the beam detector 49. The beam detector 49 receives the laser beam LB, and determines a scan start time based upon the detection of the laser beam LB. The laser beam scanner 12 always starts scanning the photosensitive drum 77 based on the scan start time, so as to justify the scanning lines.

Further, the photosensitive drum 77 rotates in a rotating direction indicated by an arrow M of FIG. 2, being driven by a stepping motor (not shown in figures), in synchronism with the scan start times. While the photosensitive drum 77 rotates in the direction M, the laser beam LB successively scans the photosensitive drum 77 to successively form a plurality of scanning lines in the sub-scanning direction. By this, the photosensitive drum 77 is entirely scanned with the laser beam LB, so that a latent image is formed with the plurality of scanning lines on the photosensitive drum 77.

Now, a relationship between a beam spot BS formed by the laser beam LB and a detection waveform of the beam detector 49 will be explained with reference to FIGS. 4A to 4C, 5A to 5C, and 6A to 6C.

FIGS. 4A and 4B schematically illustrate how the laser beam LB is, and is not, converged to the beam detector 49, respectively, when viewed along the sub-scanning direction. The first fθ lens 21 and the mirror 25 are not illustrated in FIGS. 4A and 4B, although the laser beam LB is converged in the main-scanning direction by the first fθ lens 21 and is reflected by the mirror 25 after being reflected by the polygon mirror 23, as described above. This is because the first fθ lens 21 and the mirror 25 do not effect the optical path of the laser beam LB in the sub-scanning direction. For the same reason, the plate-shaped member 48 is not illustrated in FIG. 4B. FIG. 4C shows a relationship between the beam spot BS converged in the main-scanning direction and the slit 48A.

The laser beam LB reflected by the mirror 25 is converged by the second cylinder lens 14 before passing through the slit 48A. The slit 48A has a certain size with a height H, as shown in FIG. 4C. Thus, the laser beam LB needs to be converged so as to fall within the slit 48A. After passing through the slit 48A, the laser beam LB reaches the beam detector 49. When the second cylinder lens 14 is positioned appropriately, the laser beam LB is brought to a focal point on the beam detector 49, as shown in FIG. 4A. On the other hand, if the second cylinder lens 14 is not positioned appropriately, the laser beam LB will not come into a focus on the beam detector 49, as shown in FIG. 4B.

Figure 5A:
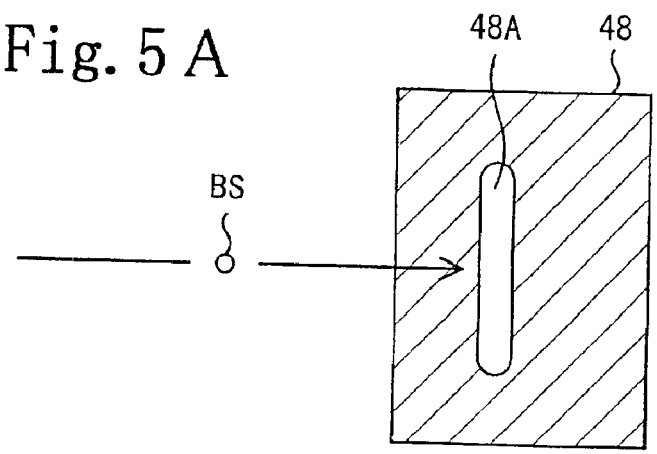
FIG. 5A shows a relationship between a slit and a beam spot that has been fully converged in both of the main- and the sub-scanning directions.
Figure 5B:
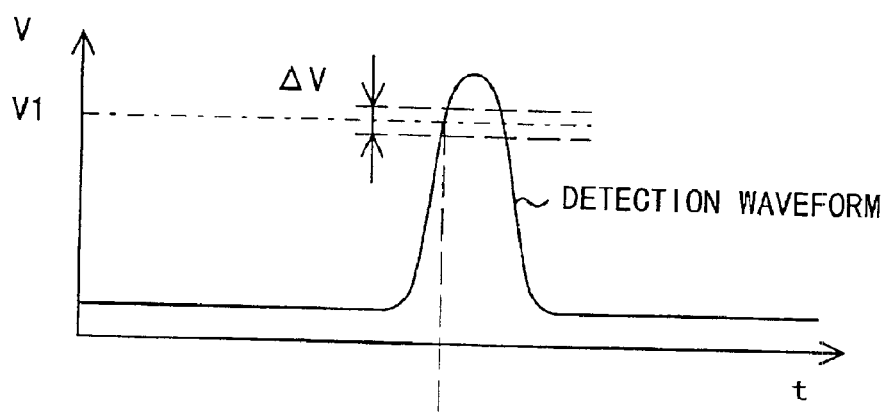
FIG. 5B shows a detection waveform of the beam detector, when the beam detector detects the beam spot of FIG. 5A.
Figure 5C:
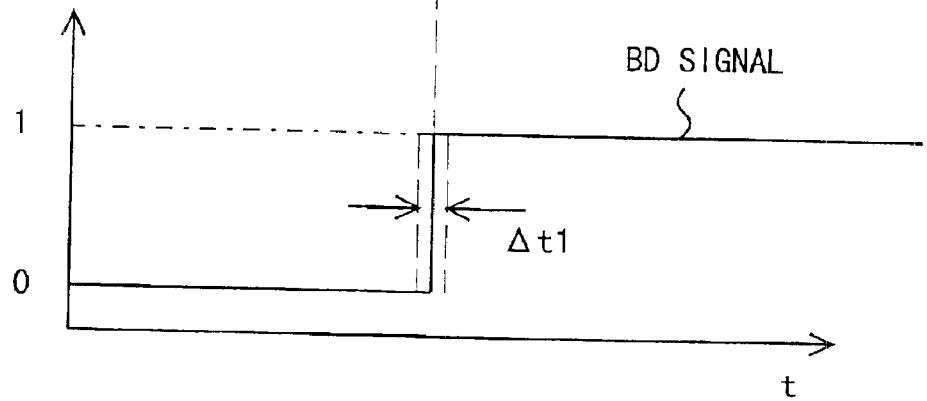
FIG. 5C shows a digital BD signal converted from the detection waveform of FIG. 5B.

FIG. 5A shows a relationship between the beam spot BS that has been fully converged in both of the main- and the sub-scanning directions and the slit 48A. FIG. 5B shows a detection waveform of the beam detector 49, when the beam detector 49 detects the beam spot BS of FIG. 5A. FIG. 5C shows a digital BD signal converted from the detection waveform of FIG. 5B.

As shown in FIG. 5A, when the laser beam LB, of which the beam spot BS has been fully converged in both of the main- and the sub-scanning directions, passes through the slit 48A, the beam detector 49 detects the laser beam LB, indicating the detection waveform of FIG. 5B. This detection waveform is in analog form, and is converted to a digital BD signal of FIG. 5C by setting a threshold value V1. At this time, however, the threshold value V1 varies with ΔV due to noise and jitters, as shown in FIG. 5B. This causes the digital BD signal to have an error Δt1 in time axis t, as shown in FIG. 5C.

Figure 6:
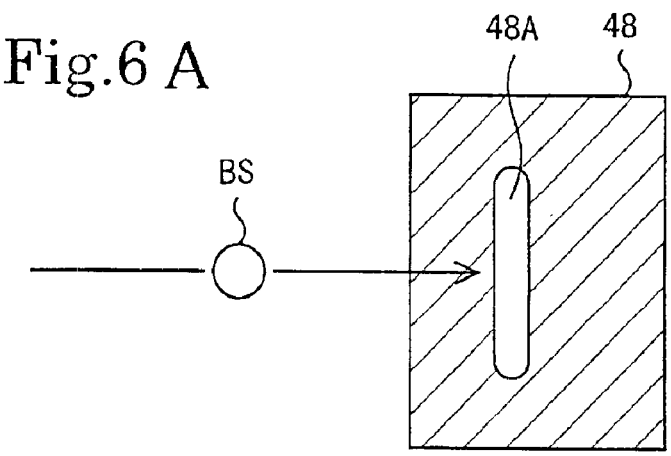
FIG. 6A shows a relationship between a slit and a beam spot that has not been fully converted in the main- and the sub-scanning directions.
FIG. 6B shows a detection waveform of the beam detector, when the beam detector detects the beam spot of FIG. 6A.
FIG. 6C shows a digital BD signal converted from the detection waveform of FIG. 6B.
Figure 6:
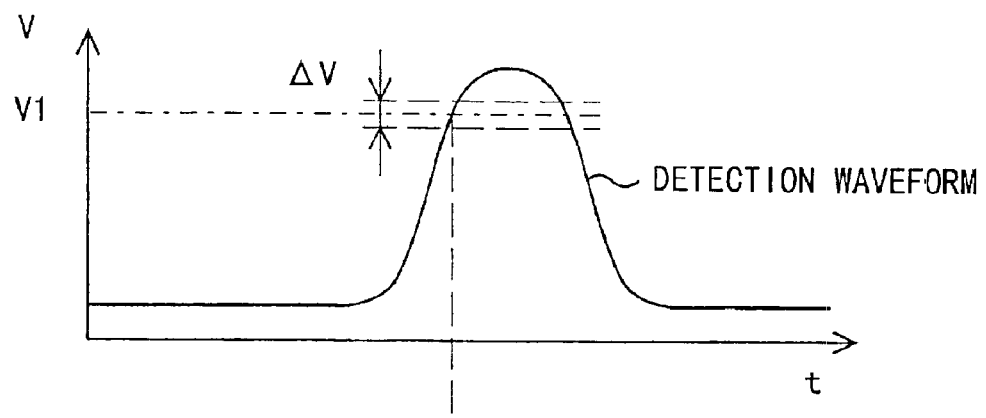
Figure 6:
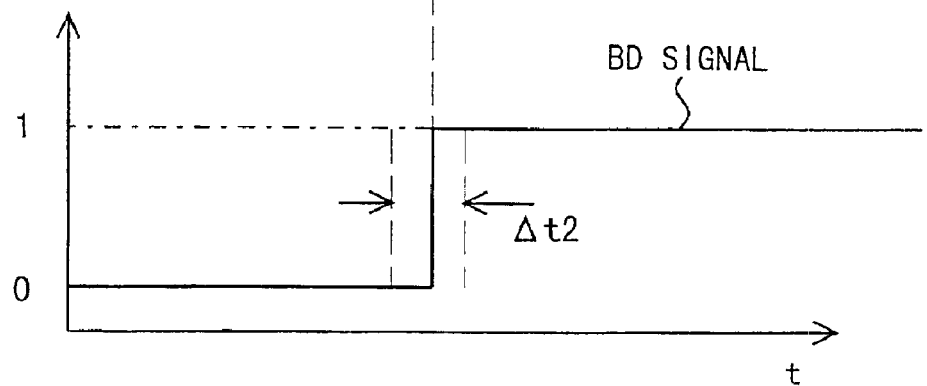

FIG. 6A shows a relationship between the beam spot BS, that has not been fully converged in the main- and the sub-scanning directions, and the slit 48A. FIG. 6B shows a detection waveform of the beam detector 49, when the beam detector 49 detects the beam spot of FIG. 6A. FIG. 6C shows a digital BD signal converted from the detection waveform of FIG. 6B.

As shown in FIGS. 6A–6C, when the laser beam LB, of which the beam spot BS has not been fully converged in the main- and the sub-scanning directions, passes through the slit 48A, the beam detector 49 detects the laser beam LB, indicating the detection waveform of FIG. 6B. The waveform of FIG. 6B is broader than the waveform of FIG. 5B. By setting the threshold value V1, the detection waveform is converted to the digital BD signal of FIG. 6C. As the detection waveform of FIG. 6B is relatively broad, the variation ΔV in the threshold value V1 generates a large error Δt2 in the digital BD signal of FIG. 6C. Apparently, the error Δt2 is larger than the error Δt1.

Further, as shown in FIG. 4C, when the laser beam LB, of which the laser spot BS has been converged only in the main-scanning direction (not converged in the sub-scanning direction), passes through the slit 48A, the beam detector 49 detects the laser beam LB, indicating the detection waveform similar to FIG. 5B. Accordingly, the beam detector 49 gives the digital BD signal similar to FIG. 5C.

In conclusion, when the beam spot BS has not been fully converged in both of the main- and the sub-scanning directions, the beam detector 49 gives the digital BD signal with the large error. However, when the beam spot BS has been fully converged in at least the main-scanning direction, the beam detector 49 can give the digital BD signal with very little error.

According to the invention, it is therefore possible for the laser beam scanner 12 to determine the scan start time precisely by detecting the laser beam LB that is fully converged in at least the main-scanning direction. The laser beam LB only needs to pass through the first fθ lens 21 before reaching the beam detector 49, but does not need to pass through the second fθ lens 22. The second cylinder lens 14 needs to have an ability to converge the laser beam LB in the sub-scanning direction, just to change the beam spot BS in size so as to fall within the slit 48A.

The positioning of the second cylinder lens 14 will be explained with reference to FIGS. 4A and 4B. Herein, L stands for a distance between the polygon mirror 23 and the beam detector 49 along an optical axis. L1 and L2 stand for distances from the polygon mirror 23 to the center of the second cylinder lens 14 and from the center of the second cylinder lens 14 to the BD sensor 49, respectively (namely, L=L1+L2). Also, a focal length of the second cylinder lens 14 is referred to as fcy.

The following equation [1] holds while the laser beam LB is focused onto the beam detector 49. Both of the signs of the distances L1 and L2 are plus.

$$(1/fcy) = (1/L1) + (1/L2) = L/(L1L2) \qquad [1]$$

Based on the equation [1], it is apparent that the distance L (=L1+L2) becomes a minimum at the condition L1=L2=2fcy. In other words, the optics of the laser beam scanner 12 have to be arranged on the condition that the distance L is larger than or equal to 4fcy, so as to converge the laser beam LB in both of the main- and the sub-scanning directions on the beam detector 49.

If such a condition is not satisfied (namely, the distance L is smaller than 4fcy), the laser beam LB can not be converged exactly and does not come into a focus on the beam detector 49, as shown in FIG. 4B. The outer edge of the laser beam LB passing through the second cylinder lens 14 deviates from the optical axis along the sub-scanning direction.

The following equations [2] to [5] hold in FIG. 4B. Herein, h1 and h2 respectively stand for deviations of the laser beam LB passing through the outmost of the second cylinder lens 14 and the beam detector 49 from the optical axis, respectively. Further, u1 and u2 stand for angles between the optical axis and the outer edge of laser beam LB from the sides of the polygon mirror 23 and the side of the beam detector 49, respectively.

$$h2=h1-L2u2 \quad [2]$$

$$u2 \equiv \tan u2 = (h1/fcy) - u1 \quad [3]$$

$$u1 \equiv \tan u1 = h1/L1 \quad [4]$$

$$L=L1+L2 \quad [5]$$

The equations [2] to [5] lead to the following equation [6]. Equation [6] indicates the spread of the beam spot BS in the sub-scanning direction on the beam detector 49.

$$h2=L1u1-L2\{(L1u1/fcy)-u1\}=(u1/fcy)(Lfcy-LL1+L1^2) \quad [6]$$

Now, the following equation [7] can be defined, when a length of the slit 48A along the sub-scanning direction is referred to as H, as shown in FIG. 4C. It is because the beam spot BS falls within the slit 48A.

$$H \geq 2h2 \quad [7]$$

Further, the condition of focusing the beam spot BS with no deviations (that is, h2=0) can deviate from the equation [6]. The following equation [6'] holds while the right side of the equation [6] is defined as 0, at the same time, it is required that u1≠0 and fcy≠0.

$$Lfcy-LL1+L1^2=0 \quad [6']$$

Regarding the equation [6'] as a second-order equation with respect to the distance L1 and the solution of the distance L1 has to be a real number. Thus, the following equation [8] is derived based on a relationship between factors in the equation [6'].

$$(-L)^2-4fcyL \geq 0 \quad [8]$$

Therefore, the beam spot BS can be properly focused at a focal point on the beam detector 49 with no deviation, when the following equation [9] is satisfied.

$$L \geq 4fcy \quad [9]$$

Even if the beam spot BS can not be focused at the focal point on the beam detector 49 properly and includes some deviation h2 (that is, L<4fcy), it is preferable that the deviation h2 is minimized. To obtain the minimum of the deviation h2, the equation [6] is differentiated with respect to L1 and the differentiated equation is defined as 0, as indicated by the following equation [10].

$$(dh2/dL1)=(u1/fcy)(-L+2L1) \quad [10]$$

As it is required u1≠0 and fcy≠0, the following equation [11] is derived from the equation [10].

$$L1=L/2 \quad [11]$$

It is therefore preferable to arrange the second cylinder lens 14 so as to satisfy the equation [11], in case that the beam spot BS can not be fully converged in the sub-scanning direction. However, it is not always necessary to satisfy the equation [11], as long as the equation [7] is satisfied.

As described above, according to this embodiment of the invention, the beam detector 49 detects the laser beam LB that has passed through the first fθ lens 21, but has not passed through the second fθ lens 22, and determines the scan start time with high precision. Therefore, the beam detector 49 is not necessarily provided at the periphery of the second fθ lens 22 and the photosensitive drum 77. This allows a saving in space around the second fθ lens 22 and the photosensitive drum 77. In addition, the first cylinder lens 13 and the second cylinder lens 14 are the same component. By using such common components, the structure of the laser beam scanner 12 according to the invention can be accomplished without an increase in manufacturing costs.

Figure 7:
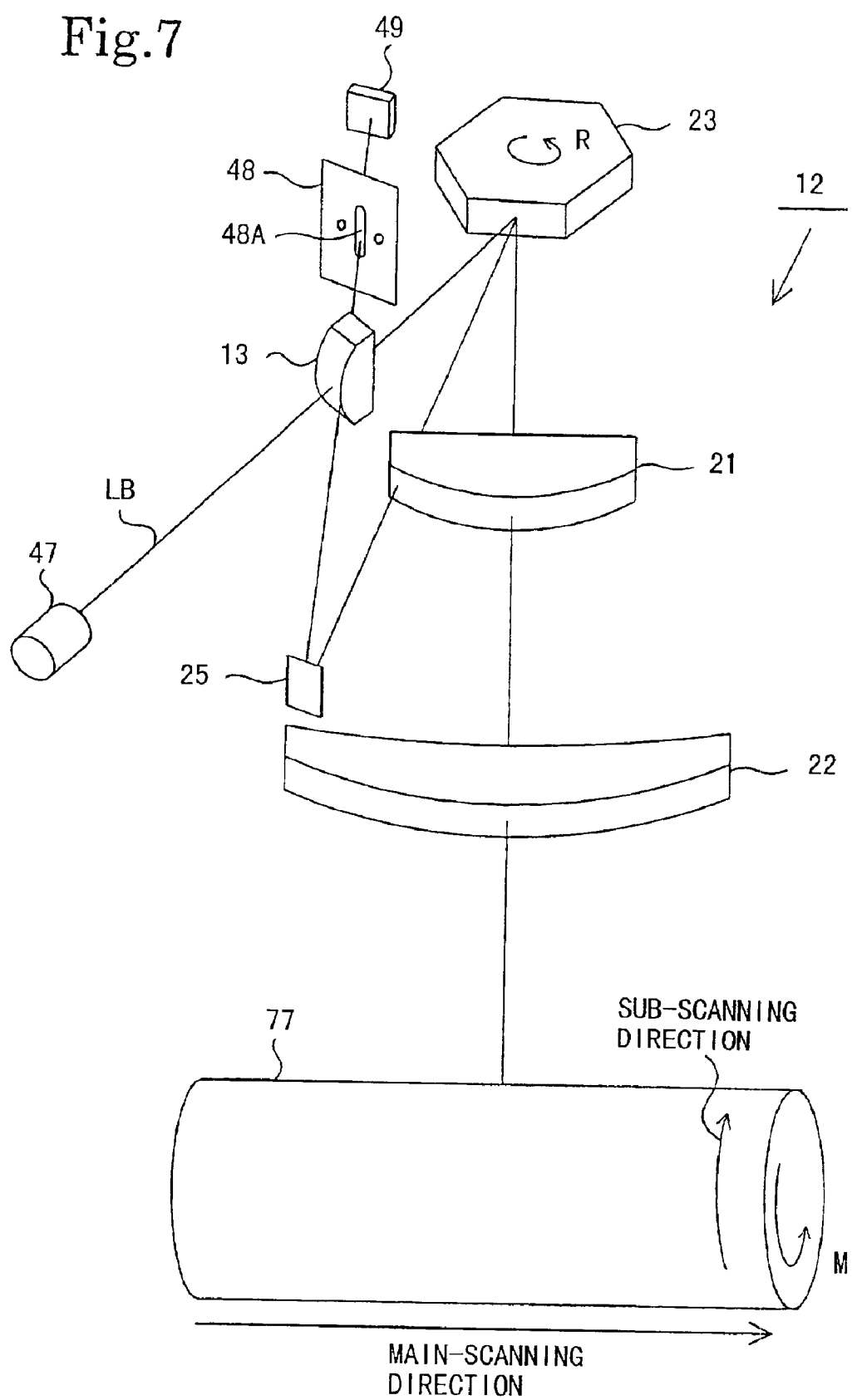
FIG. 7 is a perspective view of a laser beam scanner according to another embodiment of the invention.
Figure 8:
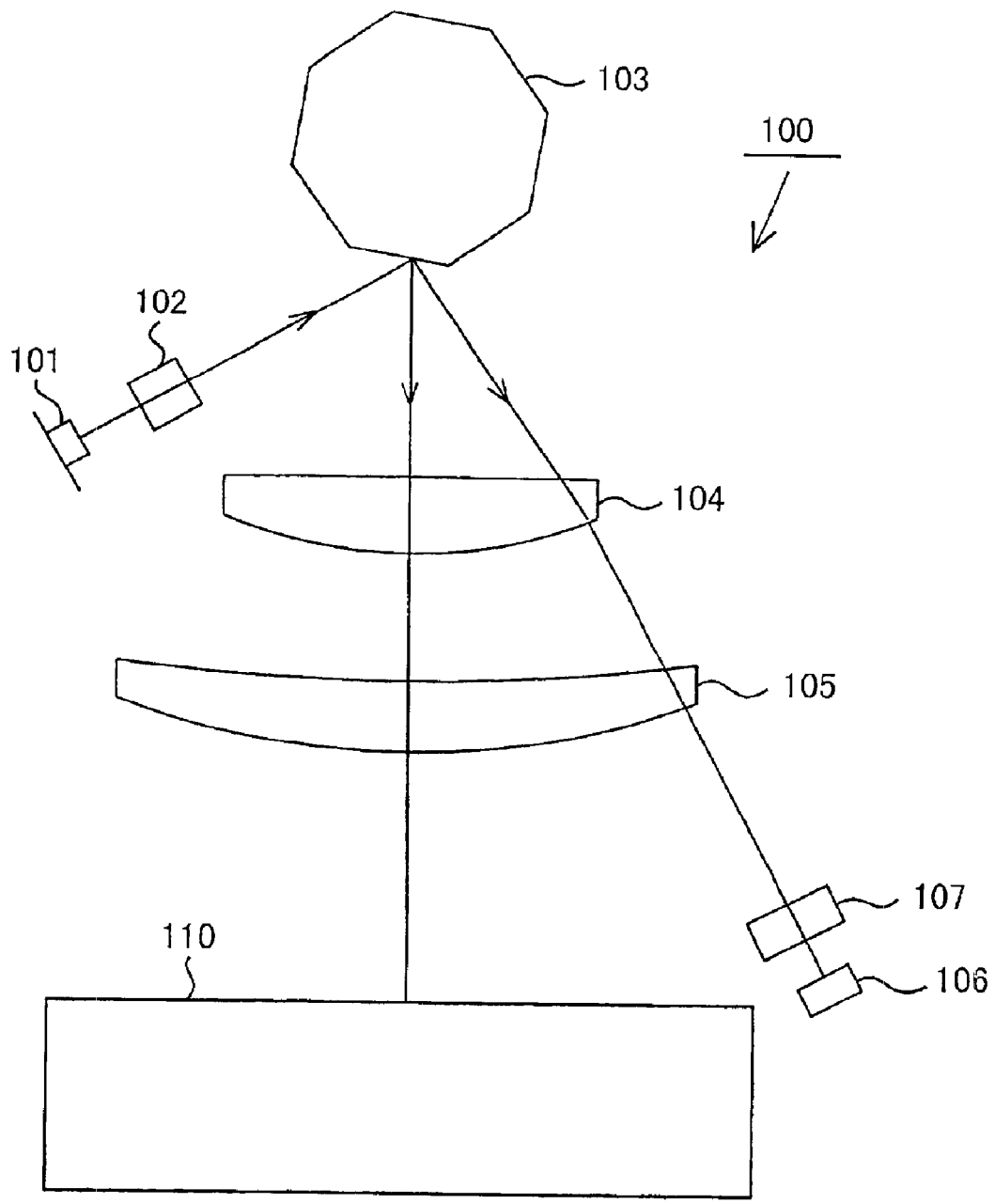
FIG. 8 is a main structure of a conventional laser beam scanner.

Next, the laser beam scanner 12 according to another embodiment of the invention will be described while referring to FIG. 7. FIG. 7 is a perspective view of the laser beam scanner 12 of another embodiment. Like parts and components are designated by the same reference numerals to avoid duplicating descriptions. The laser beam scanner 12 of this embodiment has a similar structure to the laser beam scanner of the above-explained embodiment, but the first cylinder lens 13 doubles as the second cylinder lens.

The laser beam LB emitted from the laser beam source 47 is converged by the first cylinder lens 13 to the polygon mirror 23, and is deflected by the polygon mirror 23. The deflected laser beam LB is converged by the first fθ lens 21 in the main-scanning direction, and then, is deflected by the mirror 25 to the first cylinder lens 13. The laser beam LB is converged by the first cylinder lens 13 to the beam detector 49.

As in the previously described embodiment, it is also preferable that the distance L' from the polygon mirror 23, via the first cylinder lens 13 and the mirror 25, to the beam detector and the focal length fcy' of the first cylinder lens 13 satisfy the following equation [9'] in this embodiment, to converge the beam spot BS properly at a focal point on the beam detector 49.

$$L' \geq 4fcy' \quad [9']$$

Even if the beam spot BS can not be focused on the beam detector 49 properly, it is essential to satisfy the equation [7], and it is preferable to satisfy the following equation [11'], wherein L1' stands for the distance from the polygon mirror 23 via the first fθ lens 21 and the mirror 25 to the first cylinder lens 13.

$$L1'=L'/2 \quad [11']$$

Further, according to this embodiment, it is not necessary to provide the second cylinder lens, because the first cylinder lens doubles as the second cylinder lens. This reduces a burden of arranging the optics in the laser beam scanner, thereby improving manufacturing efficiency and, at the same time, cutting manufacturing costs.

Although the invention has been described referring to the embodiment, the invention is not limited to the above embodiment, and those skilled in the art will easily conceive that various improvements and modifications can be made without deviating from the scope of the invention.

For example, the cylinder lens could be replaced with any other type of lens or a combination of other lenses that can converge the laser beam in one direction.

Moreover, the laser beam scanner of the invention will find wide application in various fields, including copiers and fax machines, and is not limited to laser printers.

What is claimed is:

1. A laser beam scanner for forming a scanning line along a main-scanning direction with a laser beam, comprising:
   a laser diode that emits the laser beam;
   a first converging unit that converges the laser beam in a main-scanning direction;
   a second converging unit that converges the laser beam, that has been converged by the first converging unit, in a sub-scanning direction substantially perpendicular to the main-scanning direction;
   a scan start time determination unit that detects, within a predetermined detection area, the laser beam that has been converged by the first converging unit before being converged by the second converging unit, and determines a scan start time upon the detection of the laser beam;
   a photosensitive medium on which a scanning line is formed along the main-scanning direction;
   a scan controller that controls a start of, at the determined scan start time, scanning the photosensitive medium with the laser beam that has been converged by the first converging unit and the second converging unit;
   a first deflector that deflects the laser beam emitted by the laser diode to the first converging unit; and
   a third converging unit that converges, in the sub-scanning direction, the laser beam that has been converged by the first converging unit and traveling to the scan start time determination unit, so that the laser beam falls within the predetermined detection area of the scan start time determination unit, wherein a first traveling distance of the laser beam along an optical axis between the first deflector and the scan start time determination unit is greater than or equal to four times a focal length of the third converging unit.

2. The laser beam scanner as claimed in claim 1, further comprising a fourth converging unit that converges the laser beam emitted by the laser diode onto the first deflector, wherein the third converging unit and the fourth converging unit are formed of a same component.

3. The laser beam scanner as claimed in claim 2, further comprising a second deflector that deflects the laser beam that has been converged by the first converging unit toward the third converging unit.

4. The laser beam scanner as claimed in claim 1, wherein the third converging unit, acting as a fourth converging unit, converges the laser beam emitted by the laser diode onto the first deflector, and, as the third converging unit, converges the laser beam that has been converged by the first converging unit onto the scan start time determination unit.

5. The laser beam scanner as claimed in claim 1, further comprising a slit having a predetermined length along the sub-scanning direction, the laser beam passing through the slit toward the scan start time determination unit after being converged by the first converging unit and the third converging unit, wherein the third converging unit converges the laser beam in the sub-scanning direction so that the laser beam falls within the slit.

6. The laser beam scanner as claimed in claim 5, wherein the third converging unit converges the laser beam in the sub-scanning direction onto the scan start time determination unit with a deviation from an optical axis of the laser beam, the deviation being smaller than or equal to a half of the predetermined length.

7. The laser beam scanner as claimed in claim 6, wherein a second traveling distance of the laser beam along an optical axis between the first deflector and the third converging unit is a half of a first traveling distance of the laser beam along the optical axis between the first deflector and the scan start time determination unit.

8. A laser beam scanner for forming a scanning line on a photosensitive medium along a main-scanning direction with a laser beam, comprising:
   beam emitting means for emitting a laser beam;
   first deflecting means for deflecting the laser beam;
   first converging means for converging the laser beam in a main-scanning direction;
   second converging means for converging the laser beam, converged by the first converging means, in a sub-scanning direction substantially perpendicular to the main-scanning direction;
   scan start time determination means for detecting the laser beam converged by the first converging means, before being converged by the second converging means, within a predetermined detection area and determining a scan start time;
   scan controlling means for controlling a start of scanning of a photosensitive medium, at the determined scan start time, with the laser beam converged by the first converging means and the second converging means, thereby forming a scanning line on the photosensitive medium along the main-scanning direction; and
   third converging means for converging, in the sub-scanning direction, the laser beam that has been converged by the first converging means and traveling to the scan start time determination means, so that the laser beam falls within the predetermined detection area of the scan start time determination means, wherein a first traveling distance of the laser beam along an optical axis between the first deflecting means and the scan start time determination means is greater than or equal to four times a focal length of the third converging means.

9. A method for forming a scanning line on a photosensitive medium along a main-scanning direction with a laser beam, comprising:
   emitting a laser beam;
   deflecting the laser beam for scanning in a main-scanning direction;
   converging the laser beam in the main-scanning direction;
   detecting the laser beam that has been converged in the main-scanning direction within a predetermined detection area, and determining a scan start time;
   converging the laser beam, that has been converged in the main-scanning direction, before reaching a photosensitive medium, in a sub-scanning direction substantially perpendicular to the main-scanning direction;
   controlling a start of scanning of the photosensitive medium, at the determined scan start time, with the laser beam that has been converged in the main-scanning direction and in the sub-scanning direction, thereby forming a scanning line on the photosensitive medium along the main-scanning direction, and
   converging the laser beam that has been converged in the main-scanning direction, before being detected in the detection step, in the sub-scanning direction, so that the laser beam falls within the predetermined detection area, wherein a first traveling distance of the laser beam along an optical axis between the deflecting and the detecting is greater than or equal to four times a focal length of a converging unit that converges the laser beam in the sub-scanning direction.

10. A laser beam scanner for forming a scanning line along a main-scanning direction with a laser beam, comprising:

a laser diode that emits the laser beam;

a first converging unit that converges the laser beam in a main-scanning direction;

a second converging unit that converges the laser beam, that has been converged by the first converging unit, in a sub-scanning direction substantially perpendicular to the main-scanning direction;

a scan start time determination unit that detects, within a predetermined detection area, the laser beam that has been converged by the first converging unit before being converged by the second converging unit, and determines a scan start time upon the detection of the laser beam;

a photosensitive medium on which a scanning line is formed along the main-scanning direction;

a scan controller that controls a start of, at the determined scan start time, scanning the photosensitive medium with the laser beam that has been converged by the first converging unit and the second converging unit;

a first deflector that deflects the laser beam emitted by the laser diode to the first converging unit;

a third converging unit that converges, in the sub-scanning direction, the laser beam that has been converged by the first converging unit and traveling to the scan start time determination unit, so that the laser beam falls within the predetermined detection area of the scan start time determination unit; and a slit having a predetermined length along the sub-scanning direction, the laser beam passing through the slit toward the scan start time determination unit after being converged by the first converging unit and the third converging unit, wherein the third converging unit converges the laser beam in the sub-scanning direction so that the laser beam falls within the slit and onto the scan start time determination unit with a deviation from an optical axis of the laser beam, the deviation being smaller than or equal to a half of the predetermined length.

11. The laser beam scanner as claimed in claim 10, further comprising a fourth converging unit that converges the laser beam emitted by the laser diode onto the first deflector, wherein the third converging unit and the fourth converging unit are formed of a same component.

12. The laser beam scanner as claimed in claim 11, further comprising a second deflector that deflects the laser beam that has been converged by the first converging unit toward the third converging unit.

13. The laser beam scanner as claimed in claim 10, wherein the third converging unit, acting as a fourth converging unit, converges the laser beam emitted by the laser diode onto the first deflector, and, as the third converging unit, converges the laser beam that has been converged by the first converging unit onto the scan start time determination unit.

14. The laser beam scanner as claimed in claim 10, wherein a second traveling distance of the laser beam along an optical axis between the first deflector and the third converging unit is a half of a first traveling distance of the laser beam along the optical axis between the first deflector and the scan start time determination unit.

15. A laser beam scanner for forming a scanning line on a photosensitive medium along a main-scanning direction with a laser beam, comprising:

beam emitting means for emitting a laser beam;

first deflecting means for deflecting the laser beam;

first converging means for converging the laser beam in a main-scanning direction;

second converging means for converging the laser beam, converged by the first converging means, in a sub-scanning direction substantially perpendicular to the main-scanning direction;

scan start time determination means for detecting the laser beam converged by the first converging means, before being converged by the second converging means, within a predetermined detection area and determining a scan start time;

scan controlling means for controlling a start of scanning of a photosensitive medium, at the determined scan start time, with the laser beam converged by the first converging means and the second converging means, thereby forming a scanning line on the photosensitive medium along the main-scanning direction;

third converging means for converging, in the sub-scanning direction, the laser beam that has been converged by the first converging means and traveling to the scan start time determination means, so that the laser beam falls within the predetermined detection area of the scan start time determination means; and a slit having a predetermined length along the sub-scanning direction, the laser beam passing through the slit toward the scan start time determination means after being converged by the first converging means and the third converging means, wherein the third converging means converges the laser beam in the sub-scanning direction so that the laser beam falls within the slit and onto the scan start time determination means with a deviation from an optical axis of the laser beam, the deviation being smaller than or equal to a half of the predetermined length.

16. A method for forming a scanning line on a photosensitive medium along a main-scanning direction with a laser beam, comprising:

emitting a laser beam;

deflecting the laser beam for scanning in a main-scanning direction;

converging the laser beam in the main-scanning direction;

detecting the laser beam that has been converged in the main-scanning direction within a predetermined detection area, and determining a scan start time;

converging the laser beam, that has been converged in the main-scanning direction, before reaching a photosensitive medium, in a sub-scanning direction substantially perpendicular to the main-scanning direction;

controlling a start of scanning of the photosensitive medium, at the determined scan start time, with the laser beam that has been converged in the main-scanning direction and in the sub-scanning direction, thereby forming a scanning line on the photosensitive medium along the main-scanning direction, converging the laser beam that has been converged in the main-scanning direction, before being detected in the detecting step, in the sub-scanning direction, so that the laser beam falls within the predetermined detection area; and passing the laser beam through a slit toward the scan start time determination unit after being converged in the main scanning direction and the sub-scanning direction before being detected in the detecting step so that the laser beam falls within the slit and a deviation from an optical axis of the laser beam is smaller than or equal to a half of the predetermined length.

17. A laser beam scanner for forming a scanning line along a main-scanning direction with a laser beam, comprising:

a laser diode that emits the laser beam;

a first converging unit that converges the laser beam in a main-scanning direction;

a second converging unit that converges the laser beam, that has been converged by the first converging unit, in a sub-scanning direction substantially perpendicular to the main-scanning direction;

a scan start time determination unit that detects, within a predetermined detection area, the laser beam that has been converged by the first converging unit before being converged by the second converging unit, and determines a scan start time upon the detection of the laser beam;

a photosensitive medium on which a scanning line is formed along the main-scanning direction;

a scan controller that controls a start of, at the determined scan start time, scanning the photosensitive medium with the laser beam that has been converged by the first converging unit and the second converging unit;

a first deflector that deflects the laser beam emitted by the laser diode to the first converging unit; and a third converging unit that converges, in the sub-scanning direction, the laser beam that has been converged by the first converging unit and traveling to the scan start time determination unit, so that the laser beam falls within the predetermined detection area of the scan start time determination unit; and a fourth converging unit that converges the laser beam emitted by the laser diode onto the first deflector, wherein the third converging unit and the fourth converging unit are formed of a same component.

18. The laser beam scanner as claimed in claim 17, wherein the third converging unit, acting as a fifth converging unit, converges the laser beam emitted by the laser diode onto the first deflector, and, as the third converging unit, converges the laser beam that has been converged by the first converging unit onto the scan start time determination unit.

19. The laser beam scanner as claimed in claim 17, further comprising a slit having a predetermined length along the sub-scanning direction, the laser beam passing through the slit toward the scan start time determination unit after being converged by the first converging unit and the third converging unit, wherein the third converging unit converges the laser beam in the sub-scanning direction so that the laser beam falls within the slit.

20. The laser beam scanner as claimed in claim 19, wherein the third converging unit converges the laser beam in the sub-scanning direction onto the scan start time determination unit with a deviation from an optical axis of the laser beam, the deviation being smaller than or equal to a half of the predetermined length.

21. The laser beam scanner as claimed in claim 20, wherein a second traveling distance of the laser beam along an optical axis between the first deflector and the third converging unit is a half of a first traveling distance of the laser beam along the optical axis between the first deflector and the scan start time determination unit.

22. The laser beam scanner as claimed in claim 17, wherein a first traveling distance of the laser beam along an optical axis between the first deflector and the scan start time determination unit is greater than or equal to four times a focal length of the third converging unit.

23. The laser beam scanner as claimed in claim 17, further comprising a second deflector that deflects the laser beam that has been converged by the first converging unit toward the third converging unit.

24. A laser beam scanner for forming a scanning line on a photosensitive medium along a main-scanning direction with a laser beam, comprising:

beam emitting means for emitting a laser beam;

first converging means for converging the laser beam in a main-scanning direction;

second converging means for converging the laser beam, converged by the first converging means, in a sub-scanning direction substantially perpendicular to the main-scanning direction;

scan start time determination means for detecting the laser beam converged by the first converging means, before being converged by the second converging means, within a predetermined detection area and determining a scan start time;

scan controlling means for controlling a start of scanning of a photosensitive medium, at the determined scan start time, with the laser beam converged by the first converging means and the second converging means, thereby forming a scanning line on the photosensitive medium along the main-scanning direction;

third converging means for converging, in the sub-scanning direction, the laser beam that has been converged by the first converging means and traveling to the scan start time determination means, so that the laser beam falls within the predetermined detection area of the scan start time determination means;

first deflecting means for deflecting the laser beam emitted by the beam emitting means to the first converging means; and fourth converging means for converging the laser beam emitted by the beam emitting means onto the first deflecting means, wherein the third converging means and the fourth converging means are formed of a same component.

25. A laser beam scanner for forming a scanning line along a main-scanning direction with a laser beam, comprising:

a laser diode that emits the laser beam;

a first converging unit that converges the laser beam in a main-scanning direction;

a second converging unit that converges the laser beam, that has been converged by the first converging unit, in a sub-scanning direction substantially perpendicular to the main-scanning direction;

a scan start time determination unit that detects, within a predetermined detection area, the laser beam that has been converged by the first converging unit before being converged by the second converging unit, and determines a scan start time upon the detection of the laser beam;

a photosensitive medium on which a scanning line is formed along the main-scanning direction;

a scan controller that controls a start of, at the determined scan start time, scanning the photosensitive medium with the laser beam that has been converged by the first converging unit and the second converging unit;

a first deflector that deflects the laser beam emitted by the laser diode to the first converging unit; and a third converging unit that converges, in the sub-scanning direction, the laser beam that has been converged by the first converging unit and traveling to the scan start time determination unit, so that the laser beam falls within the predetermined detection area of the scan start time determination unit, wherein the third converging unit, acting as a fourth converging unit, converges the laser beam emitted by the laser diode onto the first deflector, and, as the third converging unit, converges the laser beam that has been converged by the first converging unit onto the scan start time determination unit.

26. A laser beam scanner for forming a scanning line on a photosensitive medium along a main-scanning direction with a laser beam, comprising:

beam emitting means for emitting a laser beam;

first converging means for converging the laser beam in a main-scanning direction;

second converging means for converging the laser beam, converged by the first converging means, in a sub-scanning direction substantially perpendicular to the main-scanning direction;

scan start time determination means for detecting the laser beam converged by the first converging means, before being converged by the second converging means, within a predetermined detection area and determining a scan start time;

scan controlling means for controlling a start of scanning of a photosensitive medium, at the determined scan start time, with the laser beam converged by the first converging means and the second converging means, thereby forming a scanning line on the photosensitive medium along the main-scanning direction;

third converging means for converging, in the sub-scanning direction, the laser beam that has been converged by the first converging means and traveling to the scan start time determination means, so that the laser beam falls within the predetermined detection area of the scan start time determination means; and first deflecting means for deflecting the laser beam emitted by the beam emitting means to the first converging means, wherein the third converging means, acting as a fourth converging means, converges the laser beam emitted by the beam emitting means onto the first deflecting means, and, as the third converging means, converges the laser beam that has been converged by the first converging means onto the scan start time determination means.

* * * * *